United States Patent [19]

Dahle et al.

[11] Patent Number: 4,659,576

[45] Date of Patent: Apr. 21, 1987

[54] SHELF OR REFRIGERATOR STABLE RAW ALIMENTARY PASTE

[75] Inventors: Leland K. Dahle, Cherry Hill; Erich P. Montgomery, Marlton, both of N.J.

[73] Assignee: Campbell Soup Company, Camden, N.J.

[21] Appl. No.: 404,777

[22] Filed: Aug. 3, 1982

[51] Int. Cl.$^4$ .................. A23L 1/16; A21D 2/22; A21D 2/14; A21D 10/00

[52] U.S. Cl. .................. 426/324; 426/331; 426/335; 426/557

[58] Field of Search .............. 426/557, 451, 532, 331, 426/335, 324

[56] References Cited

U.S. PATENT DOCUMENTS 4,361,591 11/1982 Taufig et al. .................. 426/557
4,529,609 7/1985 Gaehring et al. .................. 426/557
4,552,772 11/1985 Saitoh et al. .................. 426/557

FOREIGN PATENT DOCUMENTS

| 45-16063 | 6/1970 | Japan | 426/557 |
| 20448 | 2/1978 | Japan | 426/557 |
| 53-148526 | 12/1978 | Japan | 426/577 |
| 32964 | 4/1981 | Japan | 426/557 |
| 39615 | 9/1981 | Japan | 426/557 |

*Primary Examiner*—Steven Weinstein
*Attorney, Agent, or Firm*—Banner, Birch, McKie & Beckett

[57] ABSTRACT

A raw moist alimentary paste product is made stable against microbial decomposition by including sufficient edible acid to inhibit bacterial growth. The alimentary paste products are generally stable under refrigeration for 3 to 8 weeks and stable at ambient temperature for at least 3 weeks if a fungistat is included.

39 Claims, No Drawings

SHELF OR REFRIGERATOR STABLE RAW ALIMENTARY PASTE

TECHNICAL FIELD OF THE INVENTION

The present invention relates generally to raw, moist alimentary pastes and their preservation against microbial decomposition.

BACKGROUND ART

Farinacious products generally are better tasting when they are freshly prepared from fresh, unfrozen dough. Products such as pasta, bread dough and pie crusts are available in frozen, raw states that can be freshly baked or boiled in the home immediately prior to consumption. Freezing is a necessary expense in the manufacture and delivery of these products in order to preserve the raw farinacious products from decomposition due to bacteria, yeast and mold. Frozen products, however, are perceived by many to be less desirable than products prepared from a fresh, unfrozen dough.

Pasta specialty shops exist where fresh, raw pasta in an unfrozen state is available. The fresh pasta dough is usually purchased and cooked the same day, or at least within a very short period. These products are not, however, generally available. Consumers prefer to purchase conventional dry products in supermarkets. The pasta sold in specialty shops is not suitable for mass production and distribution from a central location to supermarkets because of the short term stability of the product against bacteria, yeast and mold.

It is known in the art that moist foods can be preserved by including an edible acid in the product. The acid lowers the pH to levels at which bacterial growth is prevented or inhibited thus imparting shelf or refrigerator stability to the food. This method of preservation, however, is not compatible with many types of food products because it can give an "acid" taste or odor to the food at effective pH levels. Thus the method of preserving moist foods with edible acids has generally been confined to either foods which are compatible with an acid taste (e.g., pickles) or foods consumed by less discriminating palates (e.g., pet foods).

DISCLOSURE OF THE INVENTION

It is an object of the present invention to provide a raw moist alimentary paste product which is shelf or refrigerator stable.

It is a further object of the present invention to provide a raw, moist alimentary paste product which includes an edible acid to stabilize the product against microbial decomposition, but does not have an acid taste when cooked.

It is also an object of the present invention to provide a method by which a raw, moist alimentary paste can be made shelf or refrigerator stable against bacterial decomposition.

It is yet another object of the present invention to provide a raw, moist alimentary paste product stable against microbial decomposition that, after several weeks of storage, tastes closer to freshly prepared alimentary paste products than conventional dried alimentary paste products.

It is yet another object of the present invention to provide a raw, moist alimentary paste product stable against microbial decomposition that cooks in less time than conventional dried pasta.

These and other objects of the present invention are achieved by a raw, moist alimentary paste stable against bacterial decomposition comprising a raw dough formed into a shape suitable for cooking and consumption, said raw dough comprising flour, water and sufficient edible acid to inhibit bacterial decomposition. The objects of the present invention are also achieved by a method of making a raw, moist alimentary paste stable against bacterial decomposition comprising the steps of (a) uniformly dispersing an edible acid throughout a raw dough comprised of flour and water, and (b) forming said dough into a shape suitable for cooking and consumption. The success of the present invention rests in part on the discovery that raw alimentary paste which contains sufficient edible acid to impart bacterial stability does not have an acid taste after boiling because the acid is leached into the cooking water.

DETAILED DESCRIPTION OF THE INVENTION

As used herein, the term "alimentary paste" includes any pasta, egg noodle or the like formed (e.g., by extrusion) from a limited moisture farinaceous dough with sufficient moisture, however, to permit formation. As also used herein, "raw, moist alimentary paste" refers to an alimentary paste which has not been significantly dried or gelatinized after formation.

The method of the present invention is adaptable to virtually any type of alimentary paste. By including a sufficient amount of an edible acid in the raw dough from which the alimentary paste is formed, a refrigerator stable product is obtained. If a fungistat is included, a shelf stable product can be made. The raw, moist alimentary paste is stable from decomposition due to bacteria and can be left on the shelf (if it contains a fungistat) or in the refrigerator cases of grocery stores for about three to about eight weeks. Although the alimentary paste of the present invention contains a significant amount of an edible acid, applicants have found that there is no acid taste in the final product because the acid leaches from the alimentary paste when it is cooked in boiling water prior to consumption. The cooking time of the alimentary paste of the present invention is significantly less than the cooking time of conventional dried pasta because it does not have to be rehydrated. The taste of the alimentary paste of the present invention is also perceived by many to be closer to that of freshly prepared alimentary paste products than the taste of the conventional dried products now available.

The present invention contemplates the inclusion of an edible acid in a conventional alimentary paste formulation. The primary components of alimentary paste formulations are flour and water. Additional components of alimentary pastes are well known in the art and may be employed in like manner in the alimentary pastes of the present invention. Typical flours include, but are not limited to, wheat flours and spinach flour. Wheat flours can be any suitable type, including whole wheat or traditional durum semolina. Water is added to the flour in sufficient quantity to make an extrudable dough. Milk is sometimes used in place of water. The term "water" as used herein, therefore, includes the water fraction of milk. Many other additives are well known in the art. Extrudable doughs generally contain about 27% to about 33% water by total weight of the dough. The exact formulation of a dough for extrusion into an alimentary paste can vary and is well within the skill of the art.

The pH of the alimentary paste is lowered by including an edible acid in the raw dough formulation discussed above. Any edible acid which lowers the pH of the alimentary paste can be used to prepare the stable alimentary paste of the present invention and the selection is within the skill of the art. Examples of such acids include, but are not limited to, acetic acid, citric acid, ascorbic acid, malic acid, fumaric acid, tartaric acid and mixtures thereof. Acetic acid is the preferred edible acid of the present invention. If browning is a problem with acetic acid formulations, an antioxidant (or an oxygenproof package) and a metal sequestrant (e.g., EDTA) can be added to the dough. A blend of ascorbic and citric acids is preferred when the raw alimentary paste product tends to undergo "browning" reactions. The antioxidant action of ascorbic acid and the metal sequestrant action of citric acid prevent browning. This is particularly helpful in whole wheat flour formulations. Care should be taken, however, to maintain a low pH in the alimentary paste because citric acid is metabolized by yeasts and molds.

Alimentary pastes including an edible acid according to the present invention are stable against microbial decomposition under refrigeration for periods of about 3 to about 8 weeks. The edible acid impedes bacterial growth and the refrigeration (generally about 33° to about 45° F.) inhibits yeasts and molds. A stable alimentary paste which does not require refrigeration is prepared by including a fungistat in addition to the edible acid. The preferred fungistat to inhibit mold and yeast is sorbic acid in a concentration ranging from about 0.1% to about 0.3%, preferably about 0.2%, based on the total weight of the moist pasta. Generally, alimentary pastes including a fungistat will be stable at ambient temperatures for at least about 3 weeks. A fungistat can also be included if increased stability is desired in a refrigerated alimentary paste. Other effective fungistats, such as potassium sorbate and calcium propionate, are known in the art. The selection and concentration of fungistats employed in the present invention are within the skill of the art.

Products of the present type, as is known in the art, can also degrade through oxidation. In the products of the present invention, rancidity may be observed after about 8 weeks for refrigerated alimentary pastes and after about 3–4 weeks for nonrefrigerated alimentary pastes. It is preferred, therefore, to protect the alimentary pastes by employing an oxygenproof container or an antioxidant (e.g., BHT, BHA, propylgallate and α-tocopherol) which will significantly extend product life. The preferred antioxidant is ascorbic acid which has the added benefit of lowering pH to contribute to microbial stability.

Many conventional formulations of alimentary paste include protein supplements. Conventional protein supplements can include, but are not limted to, egg whites, soy isolate, soy flour, whey solids, milk solids, wheat gluten, corn gluten and the like. Including protein supplements in formulations produces a firmer cooked alimentary paste as well as supplementing nutritional value and minimizing sloughing during cooking. The edible acids of the present invention can soften somewhat the cooked alimentary paste. This softening, however, is usually not objectionable. If more "bite" is desired, a protein supplement should be included in the raw dough from which the alimentary paste is formed.

Egg whites, soy isolate and soy flour are conventionally employed within the range of about 1% to about 10% based on the dry weight of the flour. Whey or milk solids are typically employed in pastas within the range of about 1% to about 6% based on the dry weight of the flour, while the range of wheat or corn gluten normally employed is about 1% to about 8%. Organoleptic considerations may impose a lower limit on corn gluten. The preferred protein is egg whites in a concentration range of about 1% to about 3%. The selection and concentration of a protein supplement is within the skill of the art.

In making the alimentary paste of the present invention, it is important to uniformly disperse the edible acid throughout the raw dough so that the alimentary paste will have a uniformly low pH. The preferred method of dispersing the acid is to mix the acid in the water prior to mixing the water with the flour to form an extrudable dough. In all other respects, the formation of the raw dough from flour, edible acid, water and other ingredients is performed according to conventional techniques and is within the skill of the art.

The exact amount of edible acid required to produce a shelf or refrigerator stable alimentary paste will vary depending upon, inter alia, the acid selected and the pH of the flour. Sufficient acid should be added so that the pH level of the alimentary paste is low enough to impart bacterial stability. The maximum allowable pH can also vary and is particularly sensitive to the bacterial contamination of the flour. For example, an alimentary paste formed from a flour which previously has been sterilized (e.g., with microwaves) can achieve microbiological stability at a higher pH than a alimentary paste formed from a nonsterilized flour. Generally, however, a pH below about 5.0, preferably below 4.5, is sufficient. Acetic acid has been successfully employed in concentrations of about 1% to about 4% based upon the mix water. A particularly useful formulation has been found to be an alimentary paste comprised of about 70% durum semolina wheat flour, containing 2% egg whites, formed into an extrudable dough with about 30% mix water. The mix water contains about 4% acetic acid. The acid concentration and maximum pH for a particular alimentary paste can be readily determined through conventional microbiological stress tests.

Once an extrudable dough is obtained (generally about 30% moisture), it may be formed into a suitable shape for cooking and consumption by conventional techniques. Usually, the dough is extruded into a conventional shape for pasta or noodles. These shapes can include, but are not limited to, spaghetti, spaghettini, fetuccini, lasagna, rigatoni, vermacelli, manicotti, shells, twists, flat noodles, round noodles, elbows and macaroni. The alimentary paste of the present invention can also be formed around a filling to produce products such as ravioli. The above shapes, well known in the art, are understood to be only a portion of the limitless variety of shapes into which alimentary paste can be formed. The present invention contemplates any alimentary paste containing edible acids irrespective of shape.

Once the alimentary paste has been formed into the desired shape, it may be desired to coat or "dust" the paste with a farinaceous material. Dusting can prevent the alimentary paste from clumping after it is packaged. Suitable farinaceous material can include, but is not limited to, corn meal or flour, preferably the flour from which the alimentary paste was formed.

The alimentary paste of the present invention can be packaged and stored in a moistureproof container. If the alimentary paste does not include an antioxidant, the container should also be oxygenproof. The preferred container is an oxygenproof, moistureproof plastic bag. The packaged alimentary paste of the present invention is stable against microbial decomposition for periods ranging from about 3 to about 8 weeks under refrigeration or on the shelf if a fungistat is included.

The alimentary paste of the present invention is boiled in water prior to consumption. The amount of water employed should be about 12 to about 15 times the weight of the alimentary paste when the acid content is in the upper portion of the range employed herein (i.e., about 4% acetic acid in the mix water). A significant portion of the edible acid leaches from the alimentary paste into the surrounding water during the cooking. If less water is used, the cooked alimentary paste could have an "acid" taste.

Conventional dried pastas can range in cooking times from about 7 to about 30 minutes depending upon shape. Standard spaghetti can range from about 10 to 25 minutes, depending upon the firmness desired. The cooking times of the alimentary paste of the present invention are approximately one third the time required to cook conventional dried alimentary paste products. Spaghetti made according to the present invention cooks in about 5 minutes.

The following examples are for illustrative purposes only and are not intended to limit the scope of the present invention. The scope of the invention is to be defined solely by the claims.

EXAMPLE 1

The following example demonstrates the microbial stability of an alimentary paste made from durum semolina wheat flour and varying levels of edible acid.

Three samples of spaghetti were made from durum semolina wheat flour in a LaParmagiana laboratory size extruder by conventional methods. All of the sample pasta products had a moisture content of 31%. The first sample was made employing mix water which contained 2% acetic acid which gave a product with a pH of 4.5. The second sample was made with mix water which contained 1% acetic acid and gave a pasta product with a pH of 4.8. The third sample was made employing mix water that contained no acid and the product had a pH of 5.5. A portion of each spaghetti sample was innoculated with spores of psychrophilic Penicillium. All of the samples were then stored at 40° F. in oxygen-permeable plastic bags. The spaghetti samples with acetic acid in the mix water did not show mold after eight weeks of storage, including the inoculated samples. The spaghetti made with the nonacidified mix water, however, developed mold after 10 days for the innoculated sample and after 14 days for the uninnoculated sample.

EXAMPLE 2

The following example demonstrates the stability of an alimentary paste according to the present invention that has been coated with corn meal.

Spaghetti was made in a LaParmagiana laboratory size extruder from durum semolina wheat flour and mix water containing 4% acetic acid. The raw pasta product had a moisture content of 29% and pH 4.1. A portion of this sample was coated with nonsterile dry corn meal to prevent the strands from clumping and then both coated and uncoated samples were placed in plastic bags permeable to oxygen. The samples were stored at 41° F. for one week and then held at ambient temperature for 8 hours before being placed back into storage at 40° F. After eight more weeks, neither the coated nor uncoated samples developed mold.

EXAMPLE 3

The following example demonstrates the increase in firmness attained by adding a protein supplement to an alimentary paste of the present invention.

Two samples of spaghetti were prepared, one from durum semolina wheat flour and the other from a mixture of 98% durum semolina wheat flour and 2% egg white. The spaghetti was made with mix water containing 1.5% acetic acid in a LaParmagiana laboratory size extruder. The raw moist pasta had a moisture content of 30% and pH 4.7. The samples were stored for eight weeks at 40° F. in a plastic bag permeable to oxygen and then cooked for 5 minutes in boiling water at a ratio of 1 part pasta to 15 parts water. The firmness of the cooked pasta was measured on an Instron tester. Pasta made from plain durum semolina had a firmness of 23.0 kg and the pasta containing egg whites had a firmness of 30.5 kg. The pastas did not have an acid taste and the durum semolina-egg white spaghetti was perceived to have the better fresh pasta taste.

EXAMPLE 4

The following example demonstrates a whole wheat alimentary paste according to the present invention.

Spaghetti was made from whole wheat flour and mix water containing 3% acetic acid and 1% ascorbic acid in a LaParmagiana laboratory size extruder. The raw pasta had a moisture content of 31% and pH 4.2. The pasta was stored for eight weeks in an oxygen-permeable plastic bag at 40° F. No mold developed and there was good retention of product color and flavor.

EXAMPLE 5

The following example demonstrates a spinach alimentary paste according to the present invention.

Spaghetti was made from a mixture of 98% durum semolina wheat flour and 2% spinach (dry solids basis). The pasta was formed with a LaParmagiana laboratory size extruder with mix water containing 3% acetic acid and 1% ascorbic acid. The raw pasta had a moisture content of 29% and pH 4.2. The pasta product was placed in an oxygen-permeable plastic bag and stored at 40° F. After eight weeks, the product exhibited good retention of color and flavor.

EXAMPLE 6

The following example is included to show an alimentary paste of the present invention that is stable against microbial decomposition at ambient temperatures.

Spaghetti was made from durum semolina wheat flour and mix water containing 4% acetic acid and 0.8% sorbic acid. The pasta was formed with a LaParmagiana laboratory size extruder. The raw pasta product had a moisture content of 29% and pH 4.0. The product was stored at ambient temperature in a plastic bag permeable to oxygen. No mold appeared after twelve weeks. Rancidity, however, began to be perceptible after about 3 to 4 weeks because no antioxidant or oxygenproof packaging was employed.

We claim:

1. A raw, moist alimentary paste stable against bacterial decomposition comprising a raw dough formed into a shape suitable for cooking and consumption, said raw dough comprising flour, water and an edible acid in sufficient amount to provide a pH level of below about 5.0 in said alimentary paste and to impart to said raw dough stability against bacterial decomposition.

2. The alimentary paste of claim 1 wherein said edible acid is one or more acids selected from the group consisting of acetic acid, citric acid, ascorbic acid, malic acid, fumaric acid and tartaric acid.

3. The alimentary paste of claim 2 wherein said edible acid is one or more acids selected from the group consisting of acetic acid, ascorbic acid and citric acid.

4. The alimentary paste of claim 3 wherein said edible acid is acetic acid at a concentration of about 1% to about 4% based on the weight of said water.

5. The alimentary paste of claim 1 wherein the pH of said raw dough is less than about 4.5.

6. The alimentary paste of claim 1, 2 or 5 wherein said flour is one or more flours selected from the group consisting of wheat flour and spinach flour.

7. The alimentary paste of claim 6 wherein said flour is durum semolina wheat flour.

8. The alimentary paste of claim 1, 2 or 5 wherein said raw dough is further comprised of a protein supplement.

9. The alimentary paste of claim 1, 2 or 5 wherein said raw dough is further comprised of a fungistat.

10. The alimentary paste of claim 1, 2 or 5 wherein said shape is selected from the group consisting of spaghetti, spaghettini, fetuccini, vermacelli, lasagna, rigatoni, manicotti, ravioli shells, shells, twists, flat noodles, round noodles, elbows and macaroni.

11. A raw, moist alimentary paste stable against bacterial decomposition comprising a raw dough formed into a shape suitable for cooking and consumption, said raw dough comprising durum semolina wheat flour, water and acetic acid in an amount ranging from about 1% to about 4% based on the weight of said water and sufficient to provide a pH level of below about 5.0 in said alimentary paste and to impart to said raw dough stability against bacterial decomposition.

12. The alimentary paste of claim 11 wherein said dough is further comprised of a fungistat.

13. The alimentary paste of claim 11 or 12 wherein said dough is further comprised of a protein supplement.

14. A method of making a raw, moist alimentary paste stable against bacterial decomposition comprising the steps of:
    (a) uniformly dispersing an edible acid throughout a raw dough comprised of flour and water, said edible acid provided in an amount sufficient to provide a pH level of below about 5.0 in said alimentary paste and impart said stability to said raw dough; and
    (b) forming said dough into a shape suitable for cooking and consumption.

15. The method of claim 14 wherein said edible acid is uniformly dispersed by adding said edible acid to said water prior to contacting said water with said flour.

16. The method of claim 14 wherein a sufficient amount of said edible acid is dispersed to lower the pH of said raw dough to less than about 4.5.

17. The method of claim 14 wherein said acid is one or more acids selected from the group consisting of acetic acid, citric acid, ascorbic acid, malic acid, fumaric acid and tartaric acid.

18. The method of claim 17 wherein said acid is one or more acids selected from the group consisting of acetic acid, ascorbic acid and citric acid.

19. The method of claim 18 wherein said acid is acetic acid added to said raw dough in an amount equal to about 1% to about 4% based on the weight of said water.

20. The method of claim 14, 15, 16 or 17 wherein said flour is comprised of one or more flours selected from the group consisting of wheat flour and spinach flour.

21. The method of claim 20 wherein said flour is comprised of durum semolina wheat flour.

22. The method of claim 14, 15, 16 or 17 wherein said raw dough is further comprised of a fungistat.

23. The method of claim 14, 15, 16 or 17 wherein said raw dough further comprises a protein supplement.

24. The method of claim 14, 15, 16 or 17 wherein said shape is selected from the group consisting of spaghetti, spaghettini, fetuccini, vermacelli, lasagna, ravioli shells, manicotti, rigatoni, shells, twists, flat noodles, round noodles, elbows and macaroni.

25. A packaged, raw, moist alimentary paste stable against bacterial decomposition comprising a container enclosing a raw dough formed into a shape suitable for cooking and consumption, said raw dough comprising flour, water and an edible acid in sufficient amount to provide a pH level of below about 5.0 in said alimentary paste and impart to said raw dough stability against bacterial decomposition.

26. The packaged alimentary paste of claim 25 wherein said edible acid is one or more acids selected from the group consisting of acetic acid, citric acid, ascorbic acid, malic acid, fumaric acid and tartaric acid.

27. The packaged alimentary paste of claim 26 wherein said edible acid is acetic acid at a concentration of from about 1% to about 4% based on the weight of said water.

28. The packaged alimentary paste of claim 27 wherein said flour is durum semolina wheat flour.

29. The packaged alimentary paste of claim 28 wherein said raw dough is further comprised of a protein supplement.

30. The packaged alimentary paste of claim 29 wherein said raw dough is further comprised of a fungistat.

31. The packaged alimentary paste of claim 30 wherein said container is moisture-proof.

32. A method of making a packaged raw, moist alimentary paste stable against bacterial decomposition comprising the steps of:
    (a) uniformly dispersing an edible acid throughout a raw dough comprised of flour and water, said edible acid provided in an amount sufficient to provide a pH level in said alimentary paste of below about 5.0 and impart said stability to said raw dough;
    (b) forming said dough into a shape suitable for cooking and consumption; and
    (c) packaging said formed raw dough in a container.

33. The method of claim 32 wherein said edible acid is uniformly dispersed by adding said edible acid to said water prior to contacting said water with said flour.

34. The method of claim 33 wherein said acid is one or more acids selected from the group consisting of acetic acid, citric acid, ascorbic acid, malic acid, fumaric acid and tartaric acid.

35. The method of claim 34 wherein said flour is comprised of durum semolina wheat flour.

36. The method of claim 35 wherein said acid is acetic acid added to said raw dough in an amount equal to about 1% to about 4% based on the weight of said water.

37. The method of claim 36 wherein said raw dough further comprises a protein supplement.

38. The method of claim 37 wherein said raw dough is further comprised of a fungistat.

39. The method of claim 38 wherein said container is moisture-proof.

* * * * *